United States Patent
Higai et al.

(10) Patent No.: US 9,162,272 B2
(45) Date of Patent: *Oct. 20, 2015

(54) CLOSED STRUCTURE PARTS, METHOD AND PRESS FORMING APPARATUS FOR MANUFACTURING THE SAME

(75) Inventors: Kazuhiko Higai, Tokyo (JP); Yuji Yamasaki, Tokyo (JP); Takaaki Hira, Tokyo (JP); Katsuhiro Ochi, Hiroshima (JP)

(73) Assignee: JFE Steel Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/120,227

(22) PCT Filed: Sep. 24, 2009

(86) PCT No.: PCT/JP2009/067124
§ 371 (c)(1),
(2), (4) Date: Mar. 22, 2011

(87) PCT Pub. No.: WO2010/035884
PCT Pub. Date: Apr. 1, 2010

(65) Prior Publication Data
US 2011/0174868 A1 Jul. 21, 2011

(30) Foreign Application Priority Data

Sep. 25, 2008 (JP) .................................. 2008-245465

(51) Int. Cl.
*B21D 22/00* (2006.01)
*B21D 22/02* (2006.01)
(Continued)

(52) U.S. Cl.
CPC *B21D 5/10* (2013.01); *B21D 39/00* (2013.01); *B21D 39/03* (2013.01); *B21D 39/037* (2013.01);
(Continued)

(58) Field of Classification Search
CPC ........ B21D 39/00; B21D 39/02; B21D 39/03; B21D 39/037; B21D 39/04; B21D 39/048; B23K 1/00; B23K 1/14; B23K 1/16; B23K 1/18; B23K 2201/00; B23K 2201/04; B23K 2201/06; B23K 2201/10
USPC ........ 228/141.1; 138/167, 168, 162, 170, 171
See application file for complete search history.

(56) References Cited

U.S. PATENT DOCUMENTS 1,863,873 A * 6/1932 Quarnstrom .................. 228/146
3,909,919 A * 10/1975 Miyabayashi et al. .......... 29/521
(Continued)

FOREIGN PATENT DOCUMENTS

JP 2-121736 A 5/1990
JP 5-228557 A 9/1993
(Continued)

*Primary Examiner* — Erin Saad
(74) *Attorney, Agent, or Firm* — DLA Piper LLP (US)

(57) ABSTRACT

A method for manufacturing a closed structure part has a closed section using a blank made from a metal plate by pressing the blank using a press forming die and fixing a pair of joint ends of the blank to each other, the method including a pre-forming step of processing the blank into an interim part having a closed section corresponding to the closed structure part, a closing step of, after the pre-forming step is completed, moving the joint ends of the interim part toward each other and urging, against one of the joint ends, a concave flange processing portion formed on one of a pair of press forming surfaces of the press forming die at the edge end adjacent to the other press forming surface, and a press joining step of, after the closing step is completed, further moving the press forming die in a pressing direction, bending the one of the joint ends using a pressing force applied from the flange processing portion so that the joint end overlaps the outer surface of the other join end and a latch flange portion for latching the other joint end is formed and, simultaneously, pressing the blank using the pair of press forming surfaces and press-forming outer portions of the pair of the joint ends of the blank into predetermined shapes.

5 Claims, 10 Drawing Sheets

(51) Int. Cl.
*B21D 5/10* (2006.01)
*B21D 39/00* (2006.01)
*B23K 1/16* (2006.01)
*B21D 39/03* (2006.01)
*B23K 1/00* (2006.01)
*B21D 39/04* (2006.01)
*B23K 1/18* (2006.01)
*B23K 1/14* (2006.01)

(52) U.S. Cl.
CPC .............. *B21D 39/04* (2013.01); *B21D 39/048* (2013.01); *B23K 1/00* (2013.01); *B23K 1/14* (2013.01); *B23K 1/16* (2013.01); *B23K 1/18* (2013.01)

(56) References Cited

U.S. PATENT DOCUMENTS

| | | | | |
|---|---|---|---|---|
| 4,238,550 | A | | 12/1980 | Burgess |
| 4,395,900 | A | * | 8/1983 | Saurenman ............ 72/368 |
| 4,734,971 | A | * | 4/1988 | Dupasquier ............ 29/417 |
| 5,924,457 | A | * | 7/1999 | Inaba et al. ............ 138/162 |
| 2002/0116974 | A1 | | 8/2002 | Graber |
| 2007/0145767 | A1 | | 6/2007 | Saitoh et al. |
| 2011/0174409 | A1 | * | 7/2011 | Higai et al. ............ 138/109 |

FOREIGN PATENT DOCUMENTS

| | | |
|---|---|---|
| JP | 11-226635 A | 8/1999 |
| JP | 2000-202527 A | 7/2000 |
| JP | 2007-176361 A | 7/2007 |

\* cited by examiner (A)

(B)

(C)

CLOSED STRUCTURE PARTS, METHOD AND PRESS FORMING APPARATUS FOR MANUFACTURING THE SAME

RELATED APPLICATIONS

This is a §371 of International Application No. PCT/JP2009/067124, with an international filing date of Sep. 24, 2009 (WO 2010/035884 A1, published Apr. 1, 2010), which is based on Japanese Patent Application No. 2008-245465, filed Sep. 25, 2008, the subject matter of which is incorporated by reference.

TECHNICAL FIELD

This disclosure relates to a press forming method for manufacturing a closed structure part having a closed section by pressing a blank formed from a metal plate using a press forming die to form one joint end of the blank into a latch flange portion and engaging the latch flange portion with the other joint end, a press forming apparatus used for the press forming method, a closed structure part manufactured using the press forming method, and a closed structure part with a welded flange.

BACKGROUND

For example, to manufacture a structural part having a closed section (a closed structure part) such as a side member or a side door of a vehicle (e.g., a motor vehicle), a plurality of sub-parts of the closed structure part are formed from a metal plate (e.g., a steel plate) using press forming (i.e., press sub-parts). Thereafter, one of the press forming sub-parts is attached to another press sub-part, and the two press sub-parts are fixedly joined to each other by, for example, hemming or welding. In this way, a closed structure part is manufactured from a plurality of press sub-parts.

An example of such a closed structure part is described in Japanese Unexamined Patent Application Publication No. 2007-176361 (a door structure of a vehicle). The door structure of a vehicle described in JP '361 includes an inner panel and an outer panel each having a concave shape. The inner panel has, in an edge portion thereof, a hemming flange bent towards the outer panel. The hemming flange is bent to pinch the edge portion of the outer panel. In this way, the inner panel is joined to the outer panel by hemming.

In addition, Japanese Unexamined Patent Application Publication No. 5-228557 describes a hemming apparatus for joining an outer panel to an inner panel by hemming (press hemming) (refer to, in particular, Paragraphs [0002] and [0003] and FIGS. 5 through 10). To join an outer panel to an inner panel, the hemming apparatus places the inner panel and the outer panel so that the inner panel and the outer panel overlap each other, brings a pre-hemming steel into contact with the top end portion of the hemming flange of the outer panel, and urges the top end portion in the diagonally downward direction to bend the top portion. Thereafter, the hemming apparatus moves the pre-hemming steel downward to further bend the hemming flange. The edge portion of the inner panel is pinched by the hemming flange of the outer panel. In this way, the outer panel is joined to the inner panel by hemming.

In addition, to manufacture a front side member, which is a closed structure part used to absorb a shock occurring when the vehicle collides with an object, the flange portions formed for a plurality of press parts are firmly joined with one another using welding such as spot welding, laser welding, or arc welding.

When manufacturing the above-described closed structure part having a closed section, a plurality of press sub-parts of the closed structure part are formed from, for example, a steel plate by pressing. Thereafter, the press sub-parts are placed to overlap one another. The flange portions of the press sub-parts are joined by hemming or welding. Thus, a plurality of press sub-parts are assembled into the closed structure part.

However, in general, the weight of a closed structure part having a closed section increases as the number of press sub-parts of the closed structure part increases. That is, if the number of the press sub-parts increases, a connection flange portion is needed for each of the press sub-parts. In addition, such a flange portion needs to be formed on either end of the press sub-part with an inner space therebetween. Accordingly, as the number of the press sub-parts increases, the ratio of the weight of the flange portions to the entire weight of the closed structure part increases. As a result, the weight of the closed structure part is increased.

In addition, such a closed structure part is manufactured through at least a final stage press step to form a plurality of press sub-parts of the closed structure part and a hemming step to join the press sub-parts to one another by hemming. In recent years, to reduce the manufacturing cost of closed structure parts, it has been required to manufacture closed structure parts more efficiently than ever.

Accordingly, it could be helpful to provide a method and an apparatus capable of reducing the number of sub-parts of a closed structure part and the number of steps for manufacturing the closed structure part and, therefore, efficiently manufacturing the closed structure part. It could also be helpful to provide a lightweight closed structure part by reducing the number of sub-parts.

SUMMARY

We thus provide a method for manufacturing a closed structure part having a closed section using a blank made from a metal plate by pressing the blank using a press forming die and fixing a pair of joint ends of the blank to each other, characterized in that the method includes a pre-forming step of processing the blank into an interim part having a closed section corresponding to the closed structure part, a closing step of, after the pre-forming step is completed, moving the joint ends of the interim part close to each other and urging, against one of the joint ends, a concave flange processing portion formed on one of a pair of press forming surfaces of the press forming die at the edge end adjacent to the other press forming surface, and a press joining step of, after the closing step is completed, further moving the press forming die in a pressing direction, bending the one of the joint ends using a pressing force applied from the flange processing portion so that the joint end overlaps the outer surface of the other joint end and a latch flange portion for latching the other joint end is formed and, simultaneously, pressing the blank using the pair of press forming surfaces and press-forming outer portions of the pair of the joint ends of the blank into predetermined shapes.

In the method for manufacturing a closed structure part according to [1], after the pre-forming step is completed, the closing step is performed. In the closing step, the two joint ends of the interim part are moved close to each other. In addition, an operation for urging, against one of the joint ends, a concave flange processing portion formed on one of a pair of press forming surfaces of the press forming die at the edge end adjacent to the other press forming surface is performed. Thus, the two joint ends can be brought closer to each other against the deformation resistance (springback) of the blank serving as the material of the closed structure part, and one of the joint ends can be moved into the concave flange processing portion formed on the one of the other press forming surfaces. As a result, the distance between the two joint ends of the interim part can be sufficiently decreased, and one of the joint ends can be moved into the concave flange processing portion for forming the joint end into a latch flange portion.

In addition, in the method for manufacturing a closed structure part according to [1], after the closing step is completed, the press joining step is performed. In the press joining step, the press forming die is further moved in a pressing direction. In addition, one of the joint ends is bent using a pressing force applied from the flange processing portion so that the joint end overlaps the outer surface of the other joint end and a latch flange portion for latching the other joint end is formed. Simultaneously, the blank is pressed by the pair of press forming surfaces so that outer portions of the pair of the joint ends of the blank are press-formed into predetermined shapes. As a result, the distance between the two joint ends can be sufficiently decreased. Thereafter, one of the joint ends can be formed into a latch flange portion. The latch flange portion can latch the other joint end. Thus, one of the joint ends (the latch flange portion) can be fixed to the other joint end. Simultaneously, the outer portions of the two joint ends of the interim part can be press-formed into a predetermined shape.

Therefore, according to the method for manufacturing a closed structure part described in [1], a closed structure part having a closed section can be manufactured using a blank formed from a single metal plate as a material. In addition, an operation to fix the two joint ends of the closed structure part to each other and an operation to press-form the outer portions of the two joint ends can be simultaneously performed. Accordingly, the number of sub-parts of the closed structure part and the number of steps for manufacturing the closed structure part can be reduced. As a result, the closed structure part can be efficiently manufactured.

Furthermore, according to [2], the method for manufacturing a closed structure part described in [1] is characterized in that it further includes a welding step of, after the press joining step is completed, fixing the latch flange portion to the other joint end by welding.

Still furthermore, according to [3], a press forming apparatus for use in the method for manufacturing a closed structure part according to [1] or [2] is characterized in that it includes the press forming die and driving means for moving the press forming die in the pressing direction when the closing step and the press joining step are performed. The press forming die has a pair of press forming surfaces having a shape corresponding to the outer portion of the pair of joint ends of the closed structure part and a concave flange processing portion formed on one of the press forming surfaces at the edge end adjacent to the other press forming surface.

According to the press forming apparatus used for manufacturing a closed structure part described in [3], a blank formed from a single metal plate is mounted in a press forming die, and the distance between the two joint ends is sufficiently decreased and, thereafter, the press forming die is moved by the driving means in a predetermined pressing direction. Thus, one of the joint ends is formed into a latch flange portion. By latching the latch flange portion to the other joint end, the two joint ends can be fixed to each other. In addition, the outer portions of the two joint ends of the blank (the interim part) can be press-formed into a predetermined shape. Accordingly, a closed structure part having a closed section can be manufactured using a blank formed from a single metal plate as a material. In addition, an operation to fix the two joint ends of the closed structure part to each other and an operation to press-form the outer portions of the two joint ends can be simultaneously performed. Therefore, the number of components of the closed structure part and the number of steps for manufacturing the closed structure part can be reduced. As a result, the closed structure part can be efficiently manufactured.

In addition, according to [4], the press forming apparatus used for manufacturing a closed structure part described in [3] is characterized in that the depth of the flange processing portion with respect to the one of the press forming surfaces is greater than or equal to 0.5 times a thickness of the blank and less than or equal to 4.0 times the thickness of the blank.

According to [5], a closed structure part manufactured using the method for manufacturing a closed structure part described in [1] or [2] is characterized in that it includes a body having a predetermined closed section and a latch flange portion formed by bending one of two joint ends of the body so that the joint end overlaps an outer surface of the other joint end and latches the other joint end.

According to the closed structure part described in [5], the latch flange portion is formed by bending one of two joint ends of the body so that the joint end overlaps an outer surface of the other joint end and latches the other joint end. Since the two joint ends of the body are fixed to each other, the body that is a main component of the closed structure part, the latch flange portion, and the other joint end can be integrally formed from a single metal plate (a blank). In addition, the two joint ends can be fixed to each other by using only the other joint end and the latch flange portion (one of the two joint ends) that latches the other joint end. Thus, the body can have a closed section. Accordingly, the number of sub-parts of the closed structure part can be reduced as compared with a closed structure part formed from two or more independent sub-parts. Furthermore, the ratio of the weight of the flange portion to the entire weight of the closed structure part can be reduced. As a result, the weight of the closed structure part can be efficiently reduced.

In addition, according to [6], the closed structure part described in [5] is characterized in that a width of the latch flange portion is set to a value greater than or equal to a thickness of a blank and less than or equal to 25% of the entire circumference of the cross section of the closed structure part.

As described above, a method for manufacturing a closed structure part and a press forming apparatus used for manufacturing a closed structure part can reduce the number of sub-parts of the closed structure part and the number of manufacturing steps. As a result, a closed structure part can be efficiently manufactured.

In addition, the number of sub-parts of the closed structure part can be reduced and, the weight of the closed structure part can be reduced.

DETAILED DESCRIPTION

A method for manufacturing a closed structure part, a manufacturing apparatus used in the method, and a closed structure part manufactured using our method are described below with reference to the accompanying drawings.

Structure of Closed Structure Part

Figure 1:
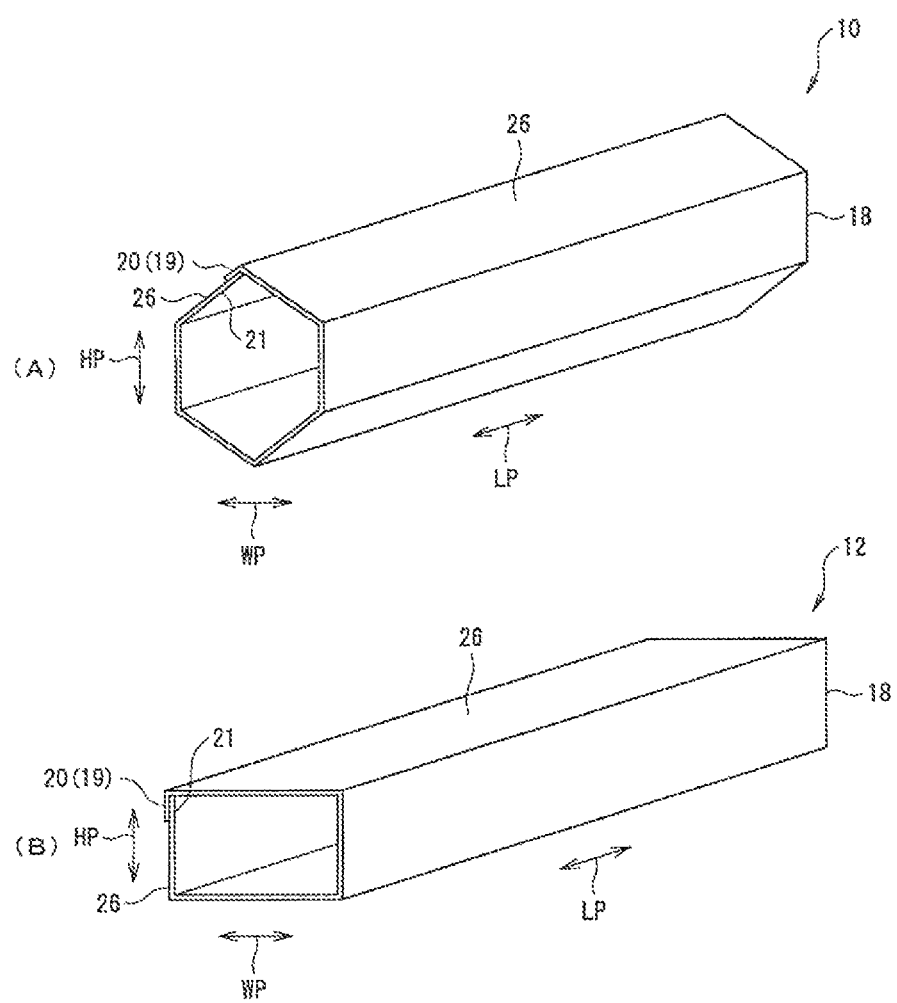
FIG. 1 is a perspective view of a closed structure part manufactured using a method for manufacturing a closed structure part.

FIGS. 1(A) and 1(B) illustrate closed structure parts manufactured using a method for manufacturing a closed structure part. Closed structure parts 10 and 12 are used as part of a side member of the body of, for example, a motor vehicle. The closed structure parts 10 and 12 are mounted so that the length direction thereof (a direction indicated by an arrow LP) is the front-rear direction of the vehicle. The material of each of the closed structure parts 10 and 12 is a metal plate (a high-tensile steel plate). Each of the closed structure parts 10 and 12 has a small tubular shape having an open end at either end.

Both ends of each of the closed structure parts 10 and 12 are parallel to each other in the length direction of a body 18. One of the ends serves as a latch flange portion 20. The other end serves as a joint end 21. The body 18, the latch flange portion 20, and the joint end 21 are formed from a blank 24 made of a high-tensile steel plate using a press forming method (see FIG. 2).

Figure 2:
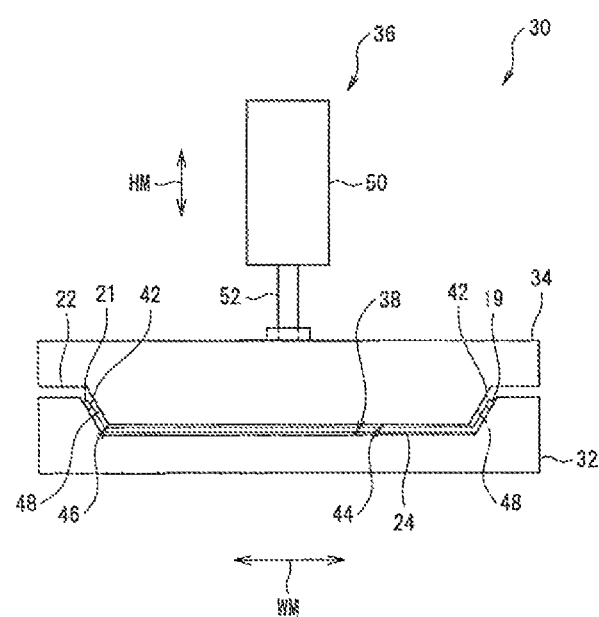
FIG. 2 is a front view of a first press forming apparatus which is an apparatus for manufacturing a closed structure part.

In this example, the blank 24 is formed in advance so that the planar shape thereof corresponds to the closed structure part 10 or 12 using a laser cutting process. The blank 24 has a rectangular shape so that the length direction of the planar shape thereof corresponds to the length direction of the closed structure part 10. As shown in FIG. 2, both ends of the blank 24 extending in a direction perpendicular to the length direction serve as joint ends 19 and 21. For each of the closed structure parts 10 and 12, the joint ends 19 and 21 of the blank 24 are fixed to each other. Thus, the body 18 having a closed section is generated.

The body 18 of each of the closed structure parts 10 and 12 may have a variety of cross-sectional shapes in accordance with a required installation space and strength of the body of the vehicle. More specifically, for example, the body 18 of the closed structure part 10 (see FIG. 1(A)) has a cross section of a substantially regular hexagonal shape. In addition, the body 18 of the closed structure part 12 has a cross section of a substantially rectangular shape. The length direction of the shape corresponds to the left-right direction of the vehicle. Note that the cross-sectional shape of the body 18 is not limited to the shapes shown in FIGS. 1(A) and 1(B). For example, the cross-sectional shape may be another polygonal shape. Alternatively, part or the entirety of the cross-sectional shape of the body 18 can be a curved shape, such as an arc or an ellipse.

When the closed structure parts 10 and 12 are manufactured, the joint end 19 is made into the latch flange portion 20 by a press forming process. The latch flange portion 20 overlaps the outer surface of the joint end 21 to latch the joint end 21. As shown in FIGS. 1(A) and 1(B), the joint end 19 of the blank 24 is bent towards the joint end 21 to function as the latch flange portion 20. In the state shown in FIGS. 1(A) and 1(B) (a finished state), the latch flange portion 20 overlaps the outer surface of the joint end 21 and is joined to the joint end 21 using spot welding, laser welding, or arc welding.

When a side member is manufactured using such a closed structure part 10 or 12, a high stiffness cap member is inserted and fixed to either end of the closed structure parts 10 or 12 in the length direction. In addition, a reinforcement member for reinforcing the closed structure part 10 or 12 or a bracket, a bolt, or a nut for connecting the closed structure part 10 or 12 to the vehicle is attached to the outer periphery or the inner periphery of the closed structure part 10 or 12 as needed. In this way, a side member, which is a component of the body of the vehicle, is manufactured.

Apparatus for Manufacturing Closed Structure Part

Figure 3:
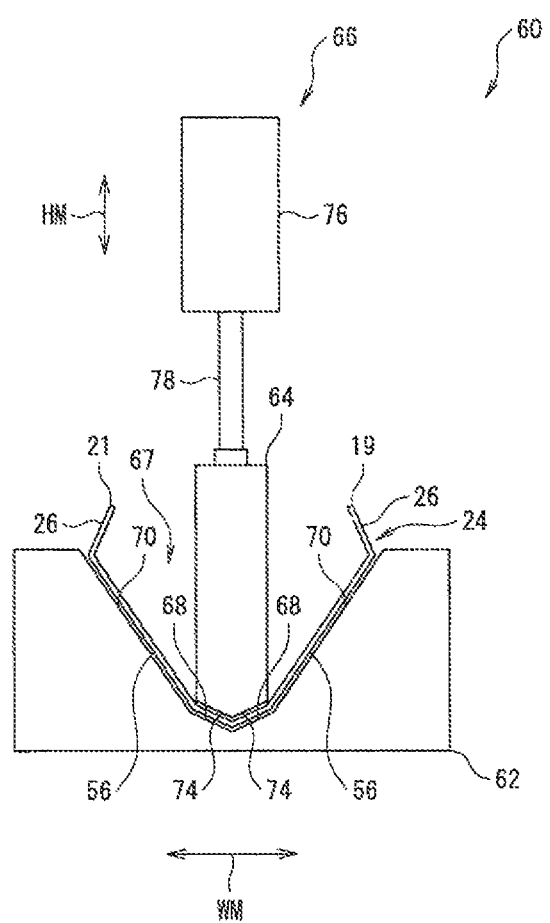
FIG. 3 is a front view of a second press forming apparatus which is an apparatus for manufacturing a closed structure part.
Figure 4:
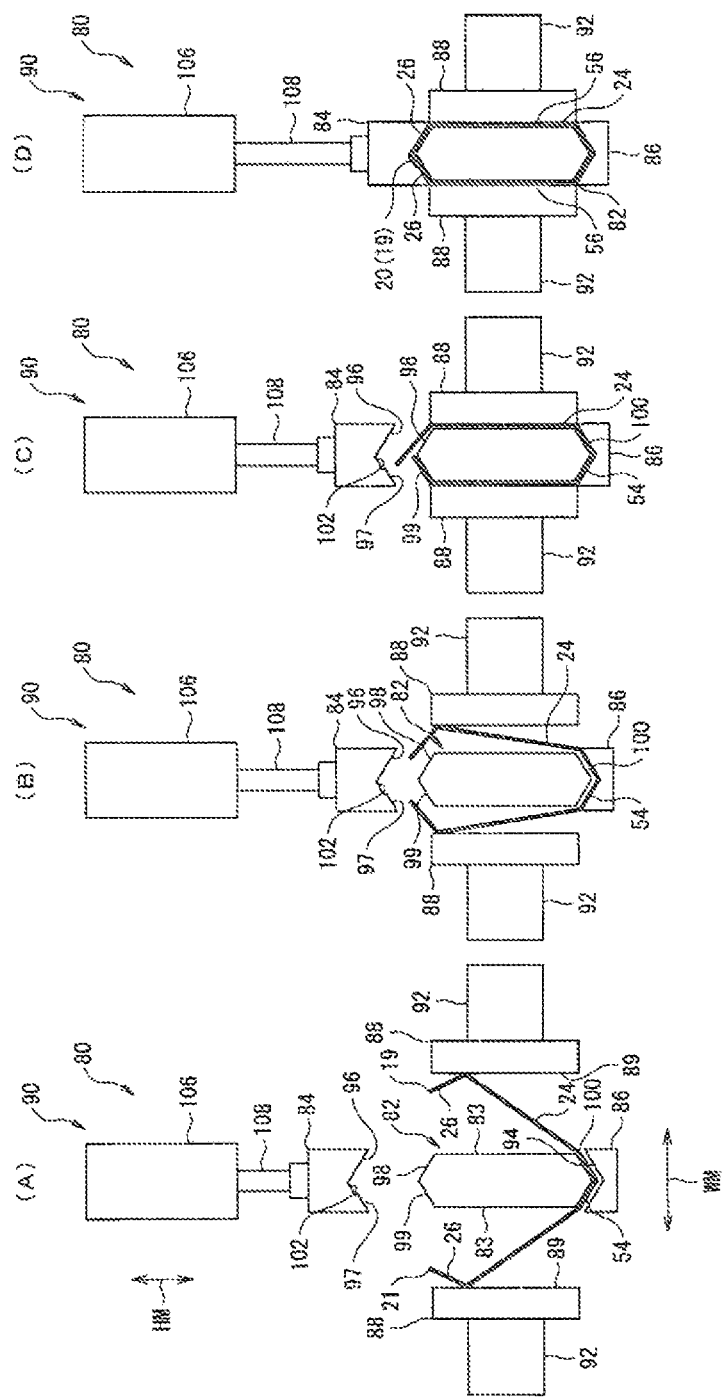
FIG. 4 is a front view of a press joining apparatus which is an apparatus for manufacturing a closed structure part.
Figure 5:
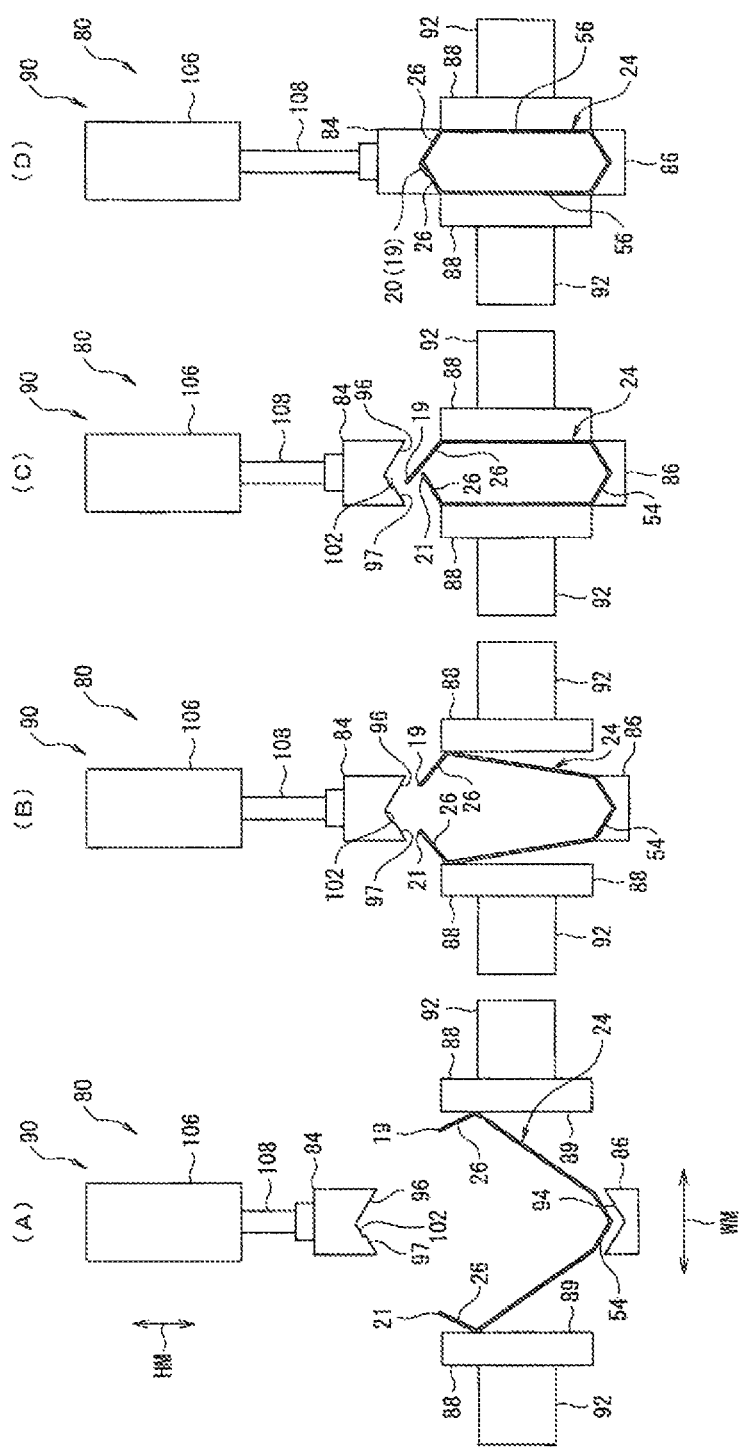
FIG. 5 is a front view of a modification of the press joining apparatus which is an apparatus for manufacturing a closed structure part.

FIGS. 2 to 4 illustrate the structures of another example of a first press forming apparatus, a second press forming apparatus, and a press joining apparatus used for manufacturing a closed structure part. In addition, FIGS. 2 to 4 illustrate closed structure parts processed by these apparatus during manufacturing. A forming step performed by the first forming apparatus or the second forming apparatus is referred to as a "pre-forming step." A first press forming apparatus 30, a second press forming apparatus 60, and a press joining apparatus 80 shown in FIGS. 2 to 4, respectively, are used for manufacturing the closed structure part 10 having a regular hexagonal cross section or a hexagonal cross section that is elongated in the vertical direction (see FIG. 1(A)).

As shown in FIG. 2, the first press forming apparatus 30 includes a press forming die having a die 32 and a punch 34. The first press forming apparatus 30 further includes a hydraulic actuator 36 serving as driving means for driving the punch 34. The die 32 has a concave press forming surface 38 in the middle of the upper surface in the width direction. The cross-sectional shape of the press forming surface 38 along the width direction is substantially trapezoidal. The press forming surface 38 includes slope surfaces 42 at either end thereof in the width direction. The slope surfaces 42 extend upwards to taper outward.

The punch 34 has a press forming surface 44 in the middle of the lower surface in the width direction. The cross-sectional shape of the press forming surface 44 along the width direction is substantially trapezoidal to correspond to the cross-sectional shape of the press forming surface 38. The punch 34 includes slope surfaces 48 at either end thereof in the width direction. The cross-sectional shapes of the slope surfaces 42 correspond to those of the slope surface 42 of the press forming surface 38.

The hydraulic actuator 36 includes a cylinder 50 and a plunger 52 disposed on the inner peripheral side of the cylinder 50. The cylinder 50 is fixed to a support frame (not shown) of the first press forming apparatus 30. The plunger 52 is supported by the cylinder 50 in a slidable manner along the height direction (a direction indicated by an arrow HM). The lower end of the plunger 52 is joined to the upper middle portion of the punch 34. Under hydraulic control of a hydraulic control unit (not shown), the hydraulic actuator 36 moves the punch 34 between a press position (see FIG. 2) at which the press forming surface 44 of the punch 34 fits together with the press forming surface 38 of the die 32 and a standby position above the die 32.

As shown in FIG. 3, like the first press forming apparatus 30, the second press forming apparatus 60 includes a press forming die including a die 62 and a punch 64. The second press forming apparatus 60 further includes a hydraulic actuator 66 serving as driving means for driving the punch 64. The die 62 has a concave blank insertion portion 67 having a substantially V shape. The blank insertion portion 67 is a recess formed in the middle of the die 62 with respect to the ends of the die 62. The bottom portion of the blank insertion portion 67 has two press forming surfaces 68 formed from two slope surfaces that form a concave shape. Two blank supporting surfaces 70 extend from the ends of the concave press forming surfaces 68 upwards to taper outward.

The punch 64 has a cross section of a substantially rectangular shape having a length direction that coincides with the height direction (indicated by the arrow HM). The lower surface of the punch 64 has two press forming surfaces 74 that correspond to the two press forming surfaces 68 and that form a concave shape.

The hydraulic actuator 66 includes a cylinder 76 and a plunger 78 disposed on the inner peripheral side of the cylinder 76. The cylinder 76 is fixed to a support frame (not shown) of the second press forming apparatus 60. The plunger 78 is supported by the cylinder 76 in a slidable manner along the height direction. The lower end of the plunger 78 is joined to the upper middle portion of the punch 64. Under hydraulic control of a hydraulic control unit (not shown), the hydraulic actuator 66 moves the punch 64 between a press position (see FIG. 3) at which the press forming surface 74 of the punch 64 fits together with the press forming surface 68 of the die 62 and a standby position above the die 62.

As shown in FIG. 4(A), the press joining apparatus 80 includes an insert core 82 having a cross section corresponding to the cross section of the body 18 of the closed structure part 10 which is the final part (see FIG. 1(A)). The press joining apparatus 80 further includes a punch 84 disposed above the insert core 82. The insert core 82 and the punch 84 serve as a press forming die. Furthermore, the press joining apparatus 80 includes a supporting pad 86 disposed beneath the insert core 82 and two pressure cams 88 disposed at either outer end of the insert core 82 in the width direction. Still furthermore, the press joining apparatus 80 includes a hydraulic actuator 90 serving as driving means for driving the punch 84 and a cam drive mechanism 92 that operates in conjunction with the hydraulic actuator 90.

The supporting pad 86 has blank supporting surfaces 94 formed from slope surfaces that form a concave shape on the upper surface side. The shape of the blank supporting surfaces 94 corresponds to the shape of a bottom plate portion 54 of the body 18. In addition, the punch 84 has press forming surfaces 96 and 97 at either end of the punch 84 in the width direction of the lower surface. Each of the press forming surfaces 96 and 97 is a slope surface that is tilted with respect to the width direction and the height direction. The upper edge of the press forming surface 96 is connected to the upper edge of the press forming surface 97, and the press forming surfaces 96 and 97 extend downward from the connected edges to taper outwardly. In addition, the shape formed by the press forming surfaces 96 and 97 corresponds to the shape of a shoulder portion 26 that is an outer portion of the latch flange portion 20 and the joint end 21 of the body 18.

In contrast, the insert core 82 has press forming surfaces 98 and 99 formed from slope surfaces on the upper side. The press forming surfaces 98 and 99 correspond to the press forming surfaces 96 and 97, respectively. In addition, the insert core 82 has, as a bottom surface, a convex blank supporting surface 100 that corresponds to blank supporting surfaces 94 of the supporting pad 86. The side surface of each of the pressure cams 88 on an inner side in the width direction serves as a pressure surface 89 corresponding to a side portion 83 of the insert core 82.

Figure 6:
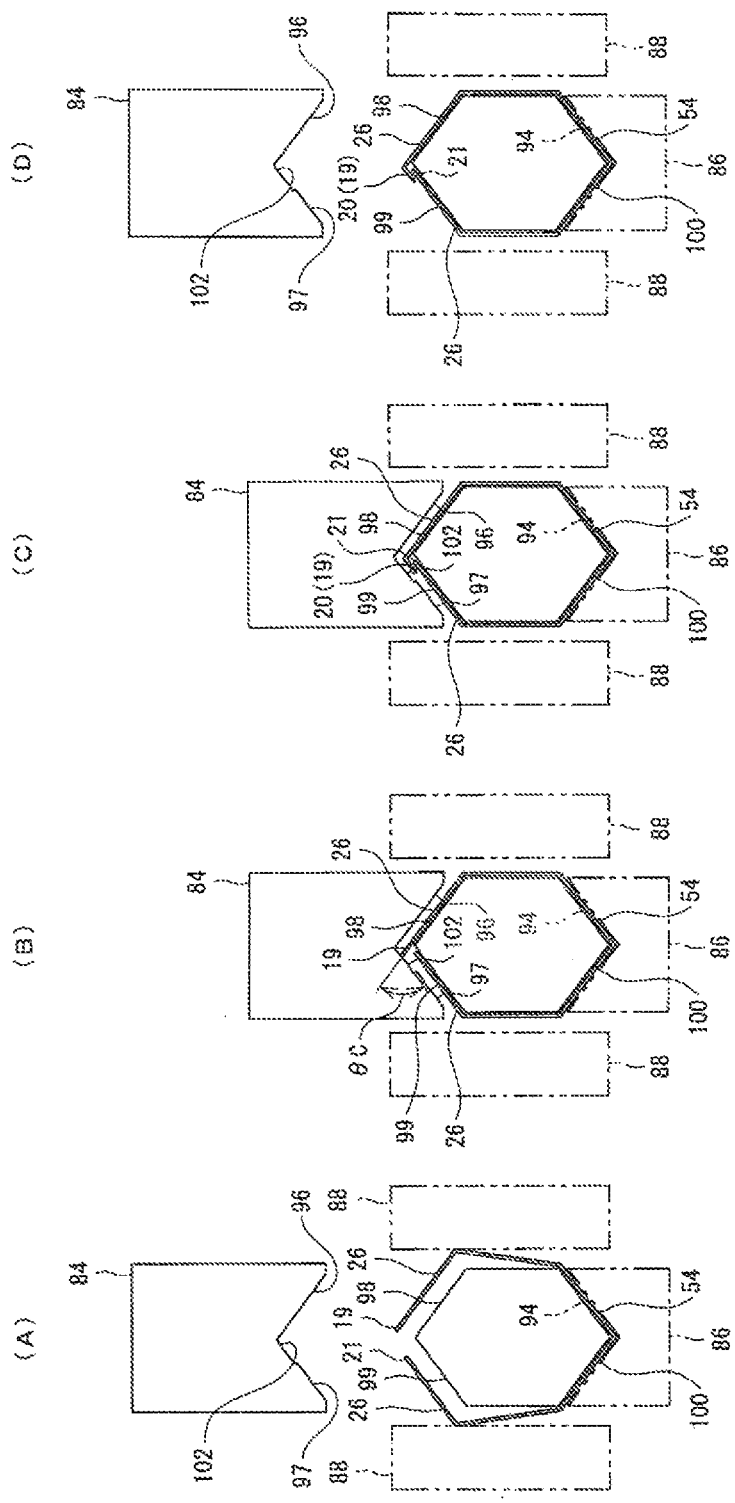
FIG. 6 is a front view of an insert core, a punch, and a supporting pad, and pressure cams used in a press joining step performed by the press joining apparatus.

As shown in FIG. 6(A), a concave flange processing portion 102 is formed in the upper end portion of the press forming surface 97 (the left surface in FIG. 6(A)) of the punch 84. The concave flange processing portion 102 linearly extends in the depth direction of the punch 84 throughout the length of the press forming surface 97. The surface of part of the press forming surface 96 having a predetermined width BP from the upper edge steps down with respect to the lower area of the concave flange processing portion 102 by a predetermined depth DP. In this way, the concave flange processing portion 102 is formed. In addition, the bottom surface of the flange processing portion 102 is substantially parallel to the press forming surface 97 extending from the lower edge of the flange processing portion 102.

Figure 8:
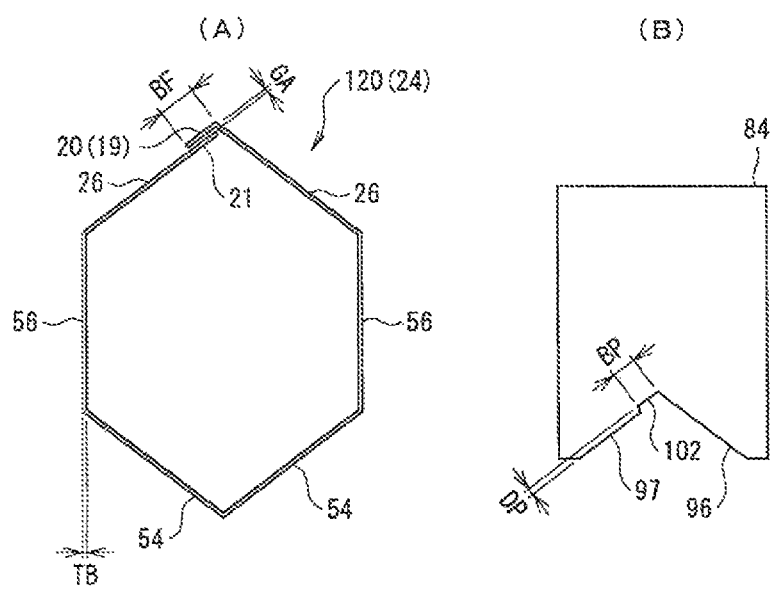
FIG. 8 is a front view of a closed structure part and a punch according to Comparative Example 1.

The depth DP of the flange processing portion 102 (see FIG. 8(B)) is appropriately set to a value greater than or equal to 0.5 times a thickness TB of the blank 24 serving as the material of the closed structure part 10 (see FIG. 8(A)) and less than or equal to 4.0 times the thickness TB. In addition, the width BP of the flange processing portion 102 (see FIG. 8(B)) is appropriately determined in accordance with a width BF of the latch flange portion 20 formed in the blank 24 (see FIG. 8(A)). More specifically, the width BP is appropriately set to a value greater than or equal to 1.0 times the width BF and less than or equal to 2.0 times the width BF. Furthermore, the width BF of the latch flange portion 20 is appropriately set to a value greater than or equal to the thickness of the blank and less than or equal to 25% of the entire circumference of the cross section of the closed structure part.

As shown in FIG. 4(A), the hydraulic actuator 90 includes a cylinder 106 and a plunger 108 disposed on the inner peripheral side of the cylinder 106. The cylinder 106 is fixed to a support frame (not shown) of the press joining apparatus 80. The plunger 108 is supported by the cylinder 106 in a slidable manner along the height direction. The lower end of the plunger 108 is joined to the upper middle portion of the punch 84. Under hydraulic control of a hydraulic control unit (not shown), the hydraulic actuator 90 moves the punch 84 between a press position (see FIG. 6(C)) at which the press forming surfaces 96 and 97 of the punch 84 fit together with the press forming surfaces 98 and 99 of the insert core 82 and a standby position above the insert core 82 (see FIG. 6(D)).

A pair of the cam drive mechanisms 92 operates in conjunction with the operation performed by the hydraulic actuator 90. The cam drive mechanisms 92 move the pressure cam 88 between a standby position (see FIG. 4(A)) to which the pressure cam 88 is moved away from the side portion of the insert core 82 along the width direction and a pressure position at which the pressure cam 88 is urged against the side portion of the insert core 82 in the width direction. More specifically, when the hydraulic actuator 90 moves the punch 84 downward from the standby position to the press position, the cam drive mechanism 92 moves the pressure cams 88 from the standby positions to the pressure positions.

In contrast, when the hydraulic actuator 90 moves the punch 84 upward from the press position to the standby position, the cam drive mechanism 92 moves the pressure cams 88 from the pressure positions to the standby positions. While the apparatus shown in FIGS. 2 to 5 has been described as a press forming apparatus that moves the punch using a hydraulic actuator, a press forming apparatus is not limited to such an apparatus. For example, a mechanical press machine (i.e., a widely used press machine) including a crank press can be used by using a similar die.

Method for Manufacturing Closed Structure Part

A method for manufacturing the closed structure part 10 using the above-described manufacturing apparatus is described next.

In a method for manufacturing a closed structure part, a first press step using the first press forming apparatus 30 may be performed first. In the first press step, the blank 24 that has been processed and cut into a predetermined planar shape in advance is mounted between the press forming surface 38 of the die 32 and the press forming surface 44 of the punch 34 of the first press forming apparatus 30. Thereafter, the punch 34 located at the standby position is lowered to the press position using the hydraulic actuator 36. In this way, as shown in FIG. 2, the blank 24 is formed into a shape corresponding to the shape formed by the press forming surface 38 and the press forming surface 44 (press forming). At that time, a pair of the shoulder portions 26 of the body 18 (see FIG. 3) are formed at either end of the blank 24 in the width direction by the slope surfaces 42 and 48.

Figure 7:
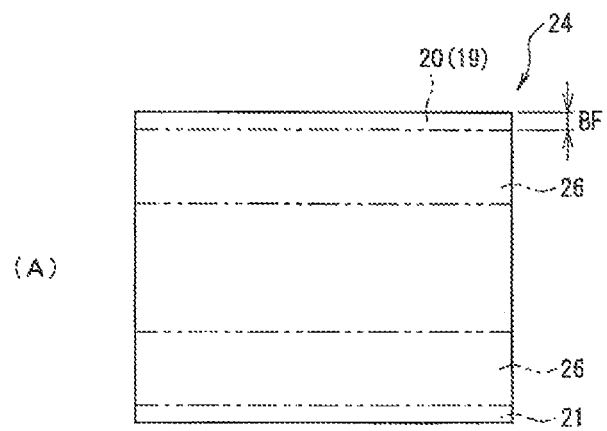
FIG. 7(A) is a plan view of a blank serving as a forming material of a closed structure part.
FIG. 7(B) is a front view illustrating the shape of the blank before the press joining step is performed.
FIG. 7(C) is a front view illustrating the shape of the blank after the press joining step has been performed.
Figure 7:
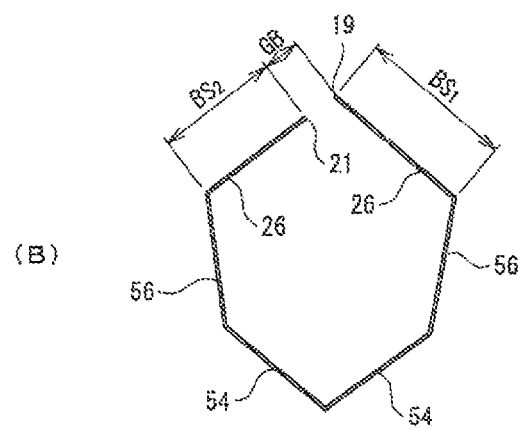
Figure 7:
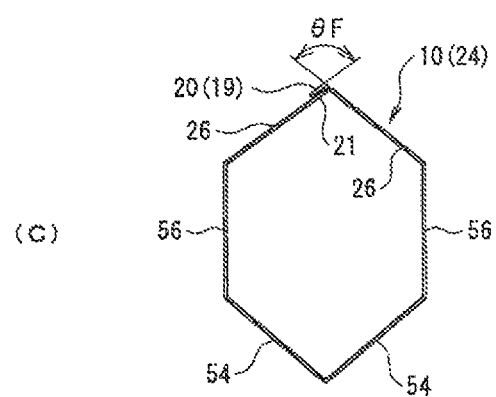

At that time, as shown in FIG. 7(B), a width $BS_1$ of one of the shoulder portions 26 is made larger than a width $BS_2$ of the other shoulder portion 26 by a value equal to the width BF of the latch flange portion 20 (see FIG. 7(A)). As shown in FIG. 3, the top ends of the shoulder portions 26 serve as joint ends 19 and 21 of the finished closed structure part 10 (the body 18). By fixing (joining) the joint ends 19 and 21 to each other, the body 18 having a closed section can be formed from the blank 24.

In the method for manufacturing a closed structure part, a second press step using the second press forming apparatus 60 may be performed after the first press step is completed. In the second press step, the blank 24 having the pair of shoulder portions 26 formed therein through the first press step is mounted on the blank insertion portion 67 of the die 62 of the second press forming apparatus 60. Thereafter, the punch 64 located at the standby position is lowered to the press position by the hydraulic actuator 66. In this way, as shown in FIG. 3, the middle portion of the blank 24 in the width direction is formed into a shape corresponding to the shape formed by the press forming surfaces 68 and 74 (press forming). At that time, the bottom plate portion 54 of the body 18 (see FIG. 7(B)) is formed in the middle of the blank 24 in the width direction. In addition, a portion of the blank 24 between each of the shoulder portions 26 and the bottom plate portion 54 serves as a side plate portion 56. Each of the two side plate portions 56 is supported by one of the two blank supporting surfaces 70 and is bent at a predetermined tilt angle with respect to the bottom plate portion 54.

In the method for manufacturing a closed structure part, a closing step and a press joining step are performed using the press joining apparatus 80 after the second press step has been completed. In the closing step, as shown in FIG. 4(A), the bottom plate portion 54 of the blank 24 is sandwiched between the blank supporting surface 94 of the supporting pad 86 and the blank supporting surface 100 of the insert core 82. At that time, the pressure surface 89 of each of the pressure cams 88 located at the standby position is brought into contact with the blank 24 at a position in the vicinity of the border between the shoulder portions 26 and the side plate portion 56.

Subsequently, as shown in FIG. 4(B), each of the pressure cam 88 located at the standby position is moved towards the pressure position using the cam drive mechanism 92. Thus, each of the side plate portions 56 is moved (bent) towards the side portion 83 of the insert core 82 and is urged against the side portion 83 by the pressure surface 89 of the pressure cam 88. At the same time, the punch 84 located at the standby position is lowered towards the press position by using the hydraulic actuator 90. Thereafter, when the punch 84 is further lowered, the top surface of one of the shoulder portions 26 (the joint end 19) is brought into contact with the bottom surface portion of the flange processing portion 102, as shown in FIG. 6(B). In this way, the closing step is completed, and the subsequent press joining step is started.

When one of the joint ends 19 is brought into contact with the flange processing portion 102, a contact angle $\theta C$ (see FIG. 6(B)) formed by the joint end 19 and the bottom surface portion of the flange processing portion 102 is about 60°. Thus, when the top end portion of the joint end 19 receives a pressing force from the flange processing portion 102 in a pressing direction, bending stress about a ridge line 101 between the press forming surface 98 and the press forming surface 99 of the insert core 82 occurs. Accordingly, as the punch 84 is lowered towards the press position, the joint end 19 is more bent about the ridge line. Thus, the top end of the joint end 19 is brought closer to the joint end 21.

As shown in FIG. 6(C), when the punch 84 is lowered to the press position, the joint end 19, as shown in FIG. 7(C), is bent to be at a predetermined flexion angle $\theta F$ (=about 120°) with respect to the joint end 19 of the shoulder portions 26. Thus, the latch flange portion 20 latching the joint end 21 together is formed. The latch flange portion 20 overlaps the outer surface of the joint end 21 to latch the joint end 21 against an elastic restoring force of the blank 24 (springback). Accordingly, the joint end 19 (the latch flange portion 20) is fixed to the joint end 21 (temporary joint). In this way, the press joining step is completed.

Thereafter, as shown in FIG. 6(D), the punch 84 is raised from the press position to the standby position. At the same time, the insert core 82 is removed from the body 18. Thus, the blank 24 having a closed section is removed from the press joining apparatus 80.

In the method for manufacturing a closed structure part, after the press joining step has been completed, a welding step may be performed using a widely used welding apparatus such as a spot welding apparatus, a laser welding apparatus, or an arc welding apparatus. During the welding step, the latch flange portion 20 and the joint end 21 are welded together using spot welding, laser welding, or arc welding. Thus, the closed structure part 10 shown in FIG. 1(A) is manufactured.

Note that the closed structure part 12 other than the closed structure part 10 can be manufactured through the steps that are substantially the same as those for the closed structure part 10 by simply mounting the dies 32 and 62, the punches 34, 64, and 84, the supporting pad 86, the pressure cams 88, and the insert core 82 that correspond to the shape of the closed structure part to be manufactured into the first press forming apparatus 30, the second press forming apparatus 60, and the press joining apparatus 80 and appropriately adjusting, for example, the strokes of the hydraulic actuators 36, 66, and 90 and the cam drive mechanism 92.

In addition, as shown in FIGS. 4(A) to 4(D), the press joining apparatus 80 includes the insert core 82 and the punch 84 serving as a press forming die. The press joining apparatus 80 performs the press joining step using the insert core 82 and the punch 84 in addition to the supporting pad 86 and the pair of pressure cams 88. However, if slightly low dimension accuracy and a slightly low accuracy of the shape of the closed structure part 10 or 12 are allowed or if the blank 24 having an excellent plastic formability is used, the press joining step (a press forming process and a joining process) can be performed using only the punch 84, the supporting pad 86, and the pair of pressure cams 88 without using the insert core 82 in the press joining apparatus 80 and supporting the blank 24 by the insert core 82 from inside, as shown in FIGS. 5(A) to 5(D).

In addition, the closed structure part 10 may be manufactured as a final part by welding together the latch flange portion 20 and the joint end 21 of the blank 24 subjected to a press joining process. However, for example, a through-hole may be formed in each of the latch flange portion 20 and the joint end 21. A bolt may be disposed in the through-holes, and a nut is screwed into the top end portion of the bolt. Alternatively, a rivet may be disposed in the through-holes, and the top end portion of the rivet may be flattened out. Thus, the latch flange portion 20 and the joint end 21 may be joined together.

In addition, at the same time as the press joining process, a bead may be formed at positions in the blank 24 at which wrinkles easily occur using the punch 84 and the insert core 82.

Operation of an Example

In the method for manufacturing a closed structure part, after the first press step and the second press step have been completed, the closing step may be performed. In the closing step, the joint end 19 and the joint end 21 of the blank 24 having a cross section corresponding to the structure part 10 are brought closer to each other using the pair of pressure cams 88. In addition, the bottom surface portion of the flange processing portion 102 formed in the other press forming surface 97 of the punch 84 is brought into pressure contact with one of the joint ends 19. Thus, the joint ends 19 and 21 are brought closer to each other against the deformation resistance (springback) of the blank 24 formed into an interim part. Since one of the joint ends 19 can be moved into the concave flange processing portion 102 formed in the other press forming surface 97, the joint end 19 can be moved into the flange processing portion 102 used for forming the latch flange portion 20 while sufficiently reducing the distance between the joint ends 19 and 21 of the blank 24.

In addition, in the method for manufacturing a closed structure part, after the closing step is completed, a press joining step is performed. In the press joining step, the punch 84 is further moved in the pressing direction. The joint end 19 of the blank 24 is bent by a pressuring force applied from the flange processing portion 102. Thus, the joint end 19 overlaps the outer surface of the joint end 21 and is formed into the latch flange portion 20 for latching the joint end 21. At the same time, the blank 24 is pressurized by the press forming surfaces 96 and 97, and the shoulder portions 26 of the blank 24 are press-formed into predetermined shapes.

In this way, the distance between the joint ends 19 and 21 is sufficiently reduced. Thereafter, the joint end 19 is made into the latch flange portion 20. By using the latch flange portion 20, the joint end 21 is latched. Thus, the joint end 19 (the latch flange portion 20) can be fixed to the joint end 21.

At the same time, the two shoulder portions 26 of the blank 24 can be press-formed into predetermined shapes.

Therefore, in the method for manufacturing a closed structure part, the closed structure part 10 having a closed section can be manufactured from the blank 24 made from a single high-tensile steel plate. In addition, the operation for fixing the joint ends 19 and 21 of the closed structure part 10 to each other and the operation for press-forming the two shoulder portions 26 can be simultaneously performed. Accordingly, the number of sub-parts and the number of manufacturing steps of the closed structure part 10 can be reduced. As a result, the closed structure part 10 can be efficiently manufactured.

In addition, according to the press joining apparatus 80, the blank 24 made from a single metal plate is mounted on the insert core 82 and the punch 84 that serve as a press forming die and the supporting pad 86. Thereafter, the punch 84 is moved in a predetermined pressing direction by using the hydraulic actuator 90. Thus, the distance between the joint ends 19 and 21 is sufficiently reduced. Subsequently, the joint end 19 is press-formed into the latch flange portion 20. By using the latch flange portion 20, the joint end 21 can be latched. In this way, the joint end 19 and the joint end 21 can be fixed to each other. In addition, the two shoulder portions 26 of the blank 24 can be press-formed into predetermined shapes. Accordingly, the closed structure part 10 having a closed section can be manufactured from the blank 24. In addition, the operation for fixing the joint ends 19 and 21 of the closed structure part 10 to each other and the operation for press-forming the two shoulder portions 26 can be simultaneously performed. Accordingly, the number of sub-parts and the number of manufacturing steps of the closed structure part 10 can be reduced. As a result, the closed structure part 10 can be efficiently manufactured.

Furthermore, in the closed structure part 10 or 12, the latch flange portion 20 may be formed by bending one of the joint ends 19 of the body 18. The latch flange portion 20 overlaps the outer surface of the other joint end 21 and latches the other joint end 21. Thus, the joint ends 19 and 21 of the body 18 are fixed to each other. In this way, the body 18, the latch flange portion 20, and the joint end 21 serving as main components of the closed structure part 10 or 12 can be integrally formed from the blank 24 made from a single metal plate. In addition, the joint ends 19 and 21 can be fixed to each other by using only the joint end 21 and the latch flange portion 20 (the joint end 19) that latches the joint end 21. Thus, the body 18 can have a closed section. Accordingly, the number of sub-parts of the closed structure part 10 or 12 can be reduced as compared with a closed structure part formed from two or more independent sub-parts. In addition, the ratio of the weight of the flange portion to the entire weight of the closed structure part 10 or 12 can be reduced. As a result, the weight of the closed structure part 10 or 12 can be efficiently reduced.

Example of Press Joining Apparatus

The dimensions of the main sub-parts of the punch 84 of the press joining apparatus 80 and the reason for selecting the dimensions are described next as an example.

As described above, the depth DP of the flange processing portion 102 is appropriately set to a value greater than or equal to 0.5 times the thickness of the blank 24, which is the material of the closed structure part 10, and less than or equal to 4.0 times the thickness. This is because if the depth DP is set to a value less than 0.5 times the thickness of the blank 24, the pressuring force applied from the flange processing portion 102 and transferred to the other joint end 21 via the latch flange portion 20 becomes too large and, therefore, the shoulder portion 26 having the joint end 21 formed therein may deform (a shape defect may occur). In contrast, if the depth DP is set to a value greater than 4.0 times the thickness of the blank 24, the flexion angle θF of the latch flange portion 20 (see FIG. 7(C)) is smaller than the design value. Thus, it is difficult for the latch flange portion 20 to reliably latch the other joint end 21.

Example of Latch Flange Portion

The dimensions of the latch flange portion 20 of the closed structure part 10 or 12 and the reason for selecting the dimensions are described next as an example.

As described above, the width BF of the latch flange portion 20 is appropriately set to a value greater than or equal to the thickness of the blank and less than or equal to 25% of the entire circumference of the cross section of the closed structure part. This is because if the width BF is less than the thickness of the blank, it is difficult for the latch flange portion 20 to reliably latch the other joint end 21. In addition, it is difficult to continuously weld the latch flange portion 20 and the joint end 21 in the length direction. In contrast, if the width BF is greater than 25% of the entire circumference of the cross section of the closed structure part, the ratio of the weight of the latch flange portion 20 to the entire weight of the closed structure parts 10 or 12 becomes too large. Thus, the weight of the closed structure parts 10 or 12 is disadvantageously increased.

In addition, the width BP of the flange processing portion 102 is appropriately set to a value greater than or equal to 1.0 times the width BF of the latch flange portion 20 and less than or equal to 2.0 times the width BF. This is because if the width BP is less than 1.0 times the width BF, the buckling distortion of the latch flange portion 20 in a direction perpendicular to the length direction easily occurs and, therefore, the flatness of the latch flange portion 20 may decrease. In contrast, if the width BP is greater than 2.0 times the width BF, the width of the other press forming surface 97 is too small with respect to the width of the shoulder portion 26 having the joint end 21 formed therein. Thus, it is difficult to sufficiently perform press forming of the shoulder portion 26.

Examples and Comparative Examples of Closed Structure Part

Closed structure parts manufactured using the method for manufacturing a closed structure part are described below as Examples 1 to 3. In addition, closed structure parts manufactured using a method for manufacturing a closed structure part that does not meet our conditions are described below as Comparative Examples 1 to 3.

In Comparative Example 1, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 8(A), a closed structure part 120 serving as an interim part is formed (press-formed). The closed structure part 120 has a hexagonal cross section that is slightly elongated in the vertical direction as compared with a substantially regular hexagonal cross section and a regular hexagonal cross section. The entire length of the closed structure part 120 is 400 mm. In addition, the width BF of the latch flange portion 20 is set to 10 mm.

However, the punch 84 (see FIG. 8(B)) having a depth DP of the flange processing portion 102 of 0.5 mm (0.4 times the thickness TB) and a width BP of 8 mm (0.8 times the width BF) is employed for the press joining apparatus 80.

Figure 9:
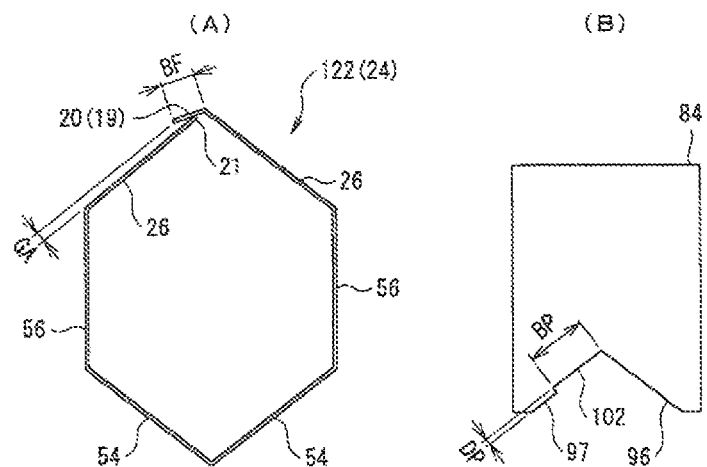
FIG. 9 is a front view of a closed structure part and a punch according to Comparative Example 2.

In contrast, in Comparative Example 2, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 9(A), a closed structure part 122 serving as an interim part is formed (press-formed). The closed structure part 122 has a cross section that is the same as that of the closed structure part 120. The entire length of the closed structure part 122 is 400 mm. In addition, the width BF of the latch flange portion 20 is set to 10 mm.

However, the punch 84 (see FIG. 9(B)) having a depth DP of the flange processing portion 102 of 6 mm (5 times the thickness TB) and a width BP of 30 mm (3 times the width BF) is employed for the press joining apparatus 80.

Figure 10:
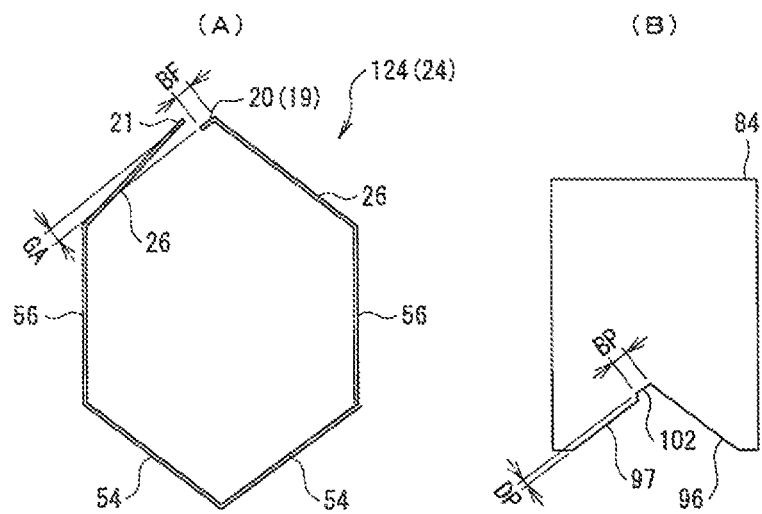
FIG. 10 is a front view of a closed structure part and a punch according to Comparative Example 3.

In contrast, in Comparative Example 3, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 10(A), a closed structure part 124 serving as an interim part is formed (press-formed). The closed structure part 124 has a cross section that is the same as that of the closed structure part 120. The entire length of the closed structure part 124 is 400 mm. However, the width BF of the latch flange portion 20 is set to 1 mm.

In addition, the punch 84 (see FIG. 10(B)) having a depth DP of the flange processing portion 102 of 1.2 mm (1 times the thickness TB) and a width BP of 4 mm (double the width BF) is employed for the press joining apparatus 80.

Figure 11:
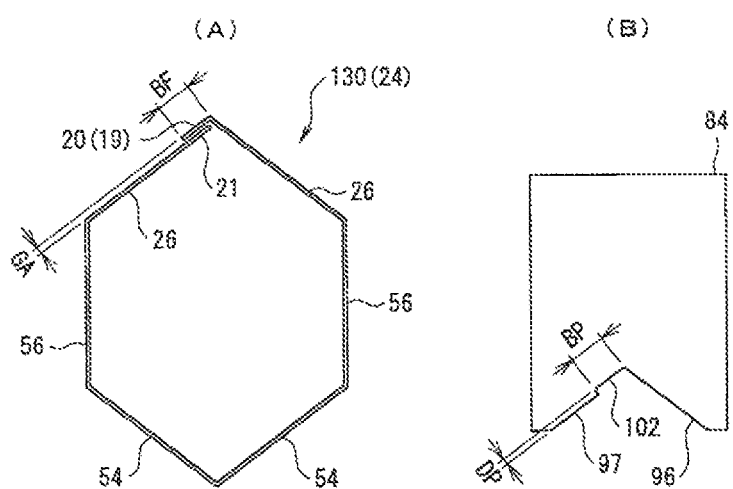
FIG. 11 is a front view of a closed structure part and a punch according to an example.

In contrast, in Example 1, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 11(A), a closed structure part 130 serving as an interim part is formed (press-formed). The closed structure part 130 has a cross section that is the same as that of the closed structure part 120. The entire length of the closed structure part 130 is 400 mm. In addition, the width BF of the latch flange portion 20 is set to 10 mm.

In addition, the punch 84 (see FIG. 11(B)) having a depth DP of the flange processing portion 102 of 1.2 mm (1 times the thickness TB) and a width BP of 15 mm (1.5 times the width BF) is employed for the press joining apparatus 80.

Figure 12:
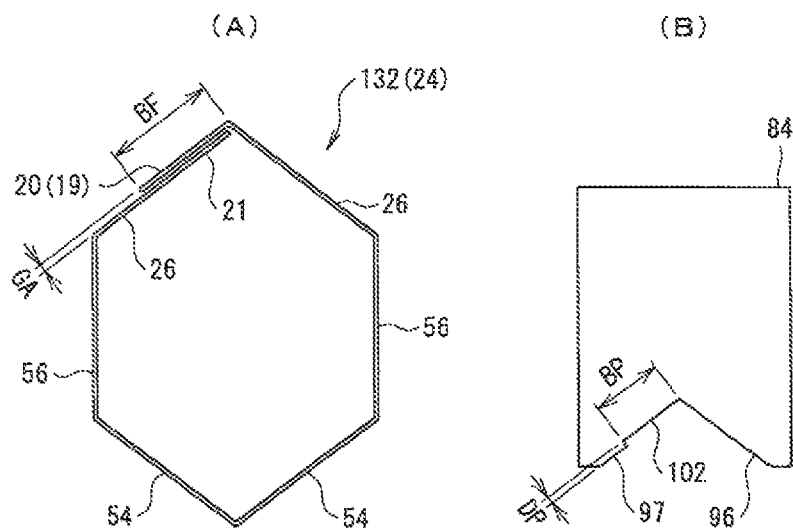
FIG. 12 is a front view of a closed structure part and a punch according to another example.

In contrast, in Example 2, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 12(A), a closed structure part 132 serving as an interim part is formed (press-formed). The closed structure part 132 has a cross section that is the same as that of the closed structure part 130. The entire length of the closed structure part 132 is 400 mm. In addition, the width BF of the latch flange portion 20 is set to 30 mm.

In addition, the punch 84 (see FIG. 12(B)) having a depth DP of the flange processing portion 102 of 1.2 mm (1 times the thickness TB) and a width BP of 30 mm (1 times the width BF) is employed for the press joining apparatus 80.

Figure 13:
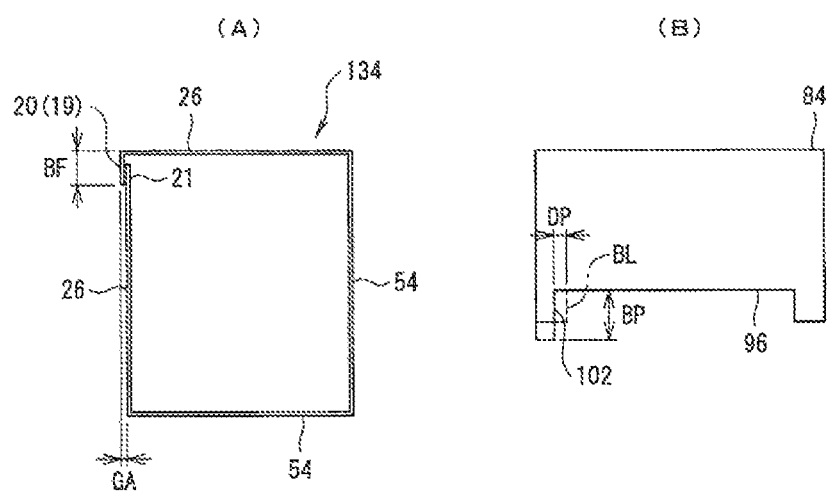
FIG. 13 is a front view of a closed structure part and a punch according to yet another example.

In contrast, in Example 3, a cold-rolled steel having a thickness TB of 1.2 mm and a tensile strength of 1180 MPa is employed as the blank 24. Such a blank 24 is subjected to a press joining process using the press joining apparatus 80. Thus, as shown in FIG. 13(A), a closed structure part 134 serving as an interim part is formed (press-formed). The closed structure part 134 has a substantially square cross section. The entire length of the closed structure part 134 is 400 mm. In addition, the width BF of the latch flange portion 20 is set to 10 mm.

In addition, as shown in FIG. 13(B), the punch 84 having the entirety of the other press forming surface 97 serving as the flange processing portion 102 is employed for the press joining apparatus 80. The width BP of the flange processing portion 102 is set to 15 mm (1.5 times the width BF), and the depth DP is set to 1.2 mm (1 times the thickness TB). In this example, the width BP of the flange processing portion 102 is equal to the distance between a reference position of the press forming surface 97 determined when the latch flange portion 20 is not present (the position indicated by the two-dot chain line shown in FIG. 13(B)) and the bottom surface portion of the flange processing portion 102.

A method for evaluating the closed structure parts 120, 122, and 124 according to the Comparative Examples and the closed structure parts 130, 132, and 134 according to our Examples is described next. A gap distance GB (a maximum value) between the joint ends 19 and 21 immediately before the blank 24 was subjected to a press joining process using the press joining apparatus 80 and a gap distance GA (a maximum value) between the joint ends 19 and 21 immediately after the blank 24 was subjected to a press joining process were measured. In such a case, to increase the welding performance, it is desirable that the gap distance GA be minimized. If the gap distance GA is about 0.3 mm, the latch flange portion 20 and the joint end 21 can be reliably welded together without externally holding the latch flange portion 20 and the other joint end 21. In addition, after the press forming was performed, the cross-sectional shape of the body 18 and the shape of the latch flange portion 20 were inspected, and the inspection result of the shapes was used as an evaluation item. In TABLE 1, "○" indicates that the cross-sectional shape of the body 18 and the shape of the latch flange portion 20 are normal. "x" indicates that at least one of the cross-sectional shape of the body 18 and the shape of the latch flange portion 20 does not meet the design shape.

Evaluation for the closed structure parts 120, 122, and 124 and the closed structure parts 130, 132, and 134 is shown in TABLE 1.

TABLE 1

| Comparative Example Number and Example Number | Closed Structure Part Number | Gap Distance GB (mm) | Gap Distance GA (mm) | Evaluation of Cross-Sectional Shape and Shape of Latch Flange Portion |
| --- | --- | --- | --- | --- |
| Comparative Example 1 | 120 | 10 | 0.2 | xbad (Latch Flange Portion Deformed) |
| Comparative Example 2 | 122 | 10 | 3.0 | xbad |
| Comparative Example 3 | 124 | 10 | 8.0 | xbad (Closed Section Not Generated) |
| Example 1 | 130 | 10 | 0.2 | ○good |
| Example 2 | 132 | 10 | 0.2 | ○good |
| Example 3 | 134 | 10 | 0.2 | ○good |

REFERENCE SIGNS LIST 10, 12 closed structure part
18 body
19 joint end
20 latch flange portion
21 joint end
24 blank
26 shoulder portion
30 first press forming apparatus
32 die
34 punch
36 hydraulic actuator
38 press forming surface
42 slope surface
44 press forming surface
48 slope surface
50 cylinder
52 plunger
54 bottom plate portion
56 side plate portion
60 second press forming apparatus
62 die
64 punch
66 hydraulic actuator
67 blank insertion portion
68 press forming surface
70 blank supporting surface
74 press forming surface
76 cylinder
78 plunger
80 press joining apparatus
82 insert core (press forming die)
83 side portion
84 punch (press forming die)
86 supporting pad
88 pressure cam
89 pressure surface
90 hydraulic actuator (driving means)
92 cam drive mechanism
94 blank supporting surface
96, 97 press forming surface
98, 99 press forming surface
100 blank supporting surface
106 cylinder
108 plunger
120, 122, 124 closed structure part
130, 132, 134 closed structure part

The invention claimed is:

1. A method of manufacturing a closed structure part having a closed section using a blank made from a metal plate by pressing the blank using a press forming die and fixing a pair of joint ends of the blank to each other, the method comprising:

a pre-forming step of processing the blank into an interim part having a cross section corresponding to the closed structure part;

a closing step of, after the pre-forming step is completed, moving the joint ends of the interim part toward each other and urging, against one of the joint ends, a concave flange processing portion formed in an upper end portion of one of a pair of press forming surfaces of the press forming die wherein each of the press forming surfaces is connected to each other at an edge end adjacent to the other press forming surface and the press forming surfaces extend downward from the connected edge ends;

wherein the concave flange processing portion linearly extends in the depth direction of the press forming die along a portion of the one of a pair of press forming surfaces and a bottom surface of the concave flange processing portion is substantially parallel to and adjacent to the one of a pair of press forming surfaces extending from the lower edge of the flange processing portion; and a press joining step of, after the closing step is completed, further moving the press forming die in a pressing direction, bending the one of the joint ends using a pressing force applied from the flange processing portion so that the joint end overlaps an outer surface of the other joint end and a latch flange portion that latches the other joint end is formed and, simultaneously, pressing the blank using the connected pair of press forming surfaces and press-forming outer portions of the pair of the joint ends of the blank into final predetermined shapes with overlapping joint ends.

2. The method according to claim 1, further comprising:

a welding step of, after the press joining step is completed, fixing the latch flange portion to the other joint end by welding.

3. A method of manufacturing a closed structure part having a closed section using a blank made from a metal plate by pressing the blank using a press forming apparatus comprising an insert core, a punch disposed above the insert core, a supporting pad disposed beneath the insert core, and fixing a pair of joint ends of the blank to each other, the method comprising:
- a pre-forming step of processing the blank into an interim part having a cross section corresponding to the closed structure part, wherein the blank is supported by the supporting pad;
- a closing step of, after the pre-forming step is completed, moving the joint ends of the interim part toward each other and toward the insert core and urging, against one of the joint ends, a concave flange processing portion formed on one of a pair of press forming surfaces of the punch fixed to each other at an edge end adjacent to the other press forming surface, wherein a bottom surface of the concave flange processing portion is substantially parallel to the one of a pair of press forming surfaces extending from the lower edge of the flange processing portion; and
- a press joining step of, after the closing step is completed, further moving the punch in a pressing direction, bending the one of the joint ends using a pressing force applied from the flange processing portion so that the joint end overlaps an outer surface of the other joint end and a latch flange portion that latches the other joint end is formed and, simultaneously, pressing the blank using the fixed pair of press forming surfaces and press-forming outer portions of the pair of the joint ends of the blank into final predetermined shapes with overlapping joint ends.

4. The method according to claim 3, further comprising:
a welding step of, after the press joining step is completed, fixing the latch flange portion to the other joint end by welding.

5. The method according to claim 1, wherein:
the depth of the flange processing portion is approximately greater than or equal to 0.5 times a thickness of the blank and less than or equal to 4.0 times the thickness of the blank.

* * * * *